United States Patent
Skelton et al.

(10) Patent No.: US 11,675,422 B2
(45) Date of Patent: Jun. 13, 2023

(54) SYSTEM FOR USER PRESENCE DETECTION

(71) Applicant: Meta Platforms Technologies, LLC, Menlo Park, CA (US)

(72) Inventors: Robert Coleman Skelton, Bellevue, WA (US); Blake Francis Andersen, Snoqualmie, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/332,656

(22) Filed: May 27, 2021

(65) Prior Publication Data
US 2022/0382366 A1    Dec. 1, 2022

(51) Int. Cl.
*G06F 3/01*       (2006.01)
*G06F 1/3234*     (2019.01)
*G06F 1/16*       (2006.01)
*G06F 1/3287*     (2019.01)
*G06F 1/3231*     (2019.01)
(Continued)

(52) U.S. Cl.
CPC ............ *G06F 3/012* (2013.01); *G06F 1/26* (2013.01); *G06F 1/3265* (2013.01); *G06F 3/011* (2013.01); *G02B 27/0176* (2013.01); *G06F 1/163* (2013.01); *G06F 1/3231* (2013.01); *G06F 1/3287* (2013.01)

(58) Field of Classification Search
CPC .......... G06F 3/012; G06F 1/26; G06F 1/3265; G06F 3/011; G06F 1/163; G06F 1/3231; G06F 1/3287; G02B 27/0176
See application file for complete search history.

(56) References Cited

U.S. PATENT DOCUMENTS 5,144,678 A * 9/1992 Lenz .................... H04R 1/1041
                                                     381/384
2005/0068256 A1 * 3/2005 Lin ....................... B60C 23/006
                                                     345/8
(Continued)

FOREIGN PATENT DOCUMENTS

JP         H0879658 A * 3/1996 ........... H04N 13/344

OTHER PUBLICATIONS https://www.allaboutcircuits.com/worksheets/time-delay-electromechanical-relays/ (Year: 2016).*

(Continued)

*Primary Examiner* — Mihir K Rayan
(74) *Attorney, Agent, or Firm* — Lee & Hayes, P.C.

(57) ABSTRACT

A device includes a display and an internal strap coupled to the display, the internal strap being adjustable to secure the device to the user. The device also includes a deformable material coupled to a portion of the internal strap and configured to contact the user when the device is secured to the user and a backing layer disposed against the deformable material, the backing layer including an aperture therein. The device further includes a switch coupled to the backing layer and configured such that at least a portion of the switch is insertable in the aperture of the backing layer, wherein the deformable material is configured to deform when the device is secured to the user, thereby causing the switch to be positioned in a first position when the device is secured to the user and a second position when the device is removed from the user.

19 Claims, 7 Drawing Sheets

(51) Int. Cl.
*G02B 27/01* (2006.01)
*G06F 1/26* (2006.01)

(56) References Cited

U.S. PATENT DOCUMENTS

| | | | | |
|---|---|---|---|---|
| 2006/0103591 | A1* | 5/2006 | Tanimura | G06F 1/3218 |
| | | | | 345/8 |
| 2009/0128450 | A1* | 5/2009 | Nakabayashi | G02B 27/0176 |
| | | | | 345/8 |
| 2011/0289661 | A1* | 12/2011 | Hammond | A42B 3/0433 |
| | | | | 2/422 |
| 2011/0291930 | A1* | 12/2011 | Wang | G06F 3/038 |
| | | | | 345/173 |
| 2015/0219901 | A1* | 8/2015 | Morimoto | G02B 27/0176 |
| | | | | 345/8 |
| 2017/0199442 | A1* | 7/2017 | Kim | G02B 26/0875 |
| 2017/0276943 | A1 | 9/2017 | Osman | |
| 2018/0199830 | A1 | 7/2018 | Basu et al. | |
| 2018/0365982 | A1* | 12/2018 | Kumar | G08G 1/005 |
| 2020/0050235 | A1* | 2/2020 | Yoon | G02B 27/0179 |

OTHER PUBLICATIONS

International Search Report and Written Opinion for International Application No. PCT/US2022/030279, dated Sep. 15, 2022, 12 pages.

\* cited by examiner

SYSTEM FOR USER PRESENCE DETECTION

BACKGROUND

Electronic devices are used in a variety of applications to provide various user experiences. For example, electronic devices are used to output media for user consumption. Some electronic devices include systems to determine user presence and control media output based on determining whether a user is present. For example, if a user is separated from a device, the electronic device can stop or pause media output and/or power off the electronic device. If a user is present, the electronic device can start or resume media output and/or power on the electronic device. Such a process can conserve power, thereby prolonging battery life of the electronic device.

However, many of these systems are prone to false positive and/or false negative detection of user presence. As such, an electronic device may incorrectly determine presence of a user and continue to output media content while a user is absent from the electronic device, reducing battery life. Conversely, an electronic device may incorrectly determine absence of the user and prevent output of the media content, causing user frustration.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Figure 1:
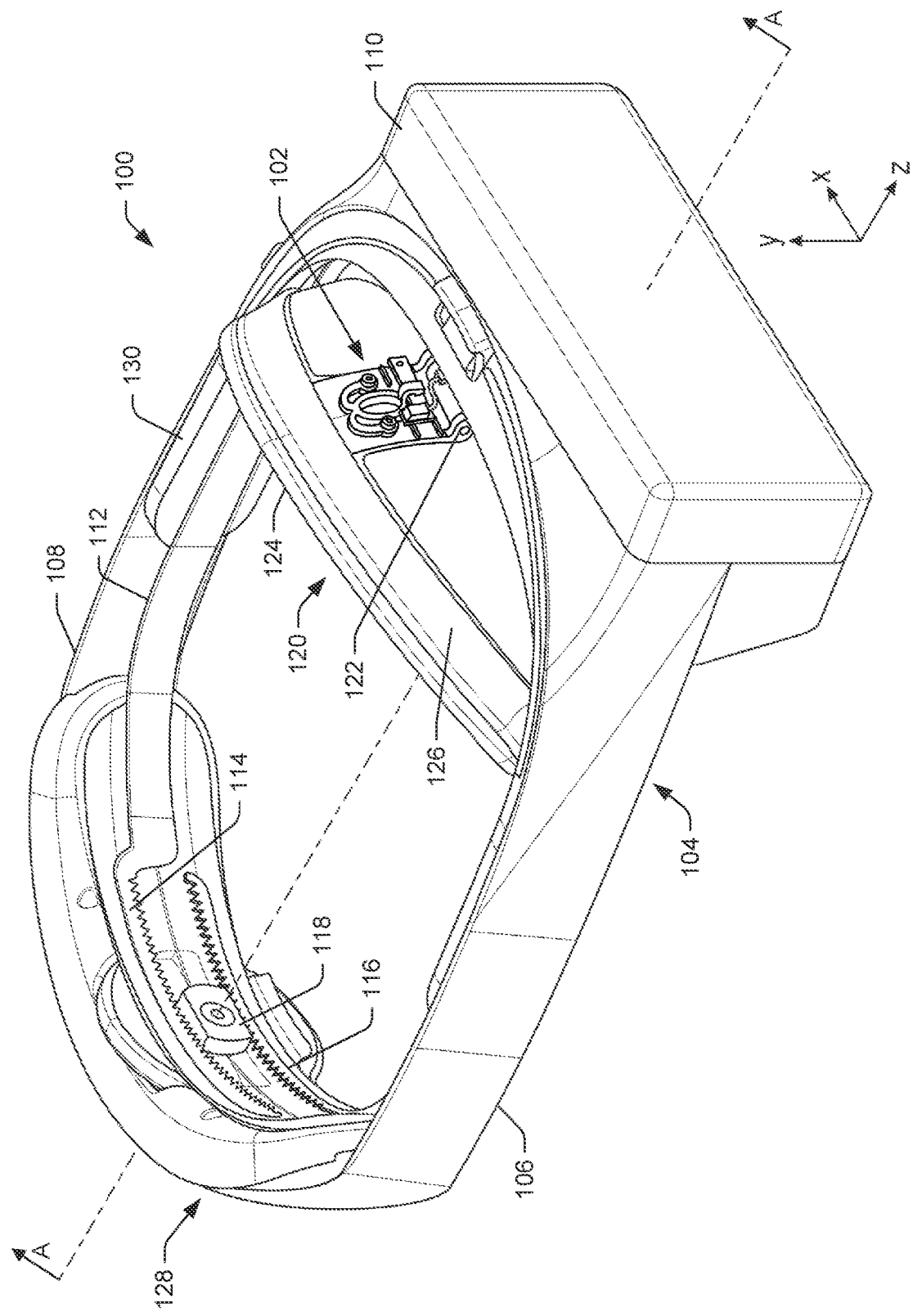
FIG. 1 illustrates a perspective view of an example headset device having a user detection switch, in accordance with an example of the present disclosure.

As discussed above, some electronic devices include systems for determining user presence and may control media output and/or power state based on determining presence or absence of the user. However, many of such systems are prone to false positives and false negatives when determining whether a user is present or absent. Such false positives and false negatives may increase when the device is a wearable device since user body types, shapes, dimensions, skin tones, etc. vary greatly. As such, the electronic devices described herein may be configured to determine the presence or absence of the user (e.g., whether the electronic device is currently being worn by the user) with increased certainty regardless of specific user body types.

In some examples, the electronic devices described herein may include a wearable device, such as, but not limited to, a head-mounted device (e.g., an electronic headset device) or other wearable device. Such head-mounted devices are referred to herein as "the headsets" and may include extended reality headsets that allow users to view, create, consume, and share media content. In some examples, the headset may include a display structure having a display which is placed over eyes of a user and allows the user to "see" the extended reality. As discussed further below, the term "extended reality" includes virtual reality, mixed reality, and/or augmented reality. The headset described herein may include an internal suspension system secured to user's head and coupled to the display structure. In this way, the headset may be positioned and securely fastened to a user's head regardless of head shape, providing equal pressure and a comfortable fit. Furthermore, the headset may include a switch incorporated therein that indicates whether the headset is secured to the user. In some examples, the headset may include one or more additional sensors for capturing additional sensor data that may be used in addition to, or instead of, the switch to determine whether the headset is secured to the user. In some examples, the device may control output of media content and/or a power state of the headset based on determining whether the headset is secured to the user.

As used herein, the term "virtual environment" or "extended reality environment" refers to a simulated environment in which users can fully or partially immerse themselves. For example, an extended reality environment can comprise virtual reality, augmented reality, mixed reality, etc. An extended reality environment can include objects and elements with which a user can interact. In many cases, a user participates in an extended reality environment using a computing device, such as a dedicated extended reality device. As used herein, the term "extended reality device" refers to a computing device having extended reality capabilities and/or features. In particular, an extended reality device can refer to a computing device that can display an extended reality graphical user interface. An extended reality device can further display one or more visual elements within the extended reality graphical user interface and receive user input that targets those visual elements. For example, an extended reality device can include, but is not limited to, a virtual reality device, an augmented reality device, or a mixed reality device. In particular, an extended reality device can include any device capable of presenting a full or partial extended reality environment. Nonlimiting examples of extended reality devices can be found throughout this application.

The headset may include an external frame that defines a general exterior shape of the headset. In some examples, the external frame may include a first side piece and a second side piece located on opposite sides of the headset and configured to extend or retract to accommodate the head of the user. In some examples, the external frame may comprise a semi-rigid material that stabilizes the headset and limits the ability of the headset to rotate about a longitudinal axis (Z axis) parallel with a gaze direction of the headset. FIG. 1 depicts a coordinate frame that includes a lateral axis (X axis) pointing from a first side of the headset to a second side of the headset. The coordinate frame shown in FIG. 1 also includes a vertical axis (Y axis) extending from a bottom side of the headset to a top side of the headset. The coordinate frame shown in FIG. 1 further includes a longitudinal axis (Z axis) extending parallel to a gaze direction of the headset, as mentioned previously.

The external frame may be coupled to a display structure that is configured to fit over at least a portion of a user's eyes. The display structure includes a display via which media content, including image data, may be output. The display structure and corresponding display may be capable of outputting media content associated with an extended reality. For example, the display structure may include one or more display devices (e.g., display screens, projectors, lenses, head-up displays, etc.) capable of providing an extended reality display. In some examples, the display may comprise one or more screens that entirely occlude all or a portion of the user's field of view of the real-world environment and replaces the user's field of view with computer generated content. In some examples, the display may be transparent or translucent such that the user can see through the display and perceive the real world environment around them (i.e., the display does not occlude the user's field of view) and the display may present computer generated content that augments or supplements the user's view of the real-world environment around them.

In some examples, the headset includes an internal strap. The internal strap may be located inside the external frame and may be coupled thereto. The internal strap may comprise an elastic material. In some examples, the internal strap includes a first end and a second end. The headset may include an adjustment mechanism configured to engage with the first end and the second end of the internal strap. In some examples, when the adjustment mechanism is adjusted, the first end and the second end of the internal strap may move relative to one another, thereby causing tension to be applied or released from the internal strap.

In some examples, the internal strap may include and/or be coupled to a forehead interface portion of the headset. The forehead interface portion is located near a front of the headset and is configured to conform to a forehead of a user, when the headset is secured to the user. In some examples, when in use the forehead interface portion is disposed between the internal strap and the forehead of the user. The internal strap may be coupled to the display portion and/or the external frame such that the internal strap at least partially supports the weight of the display portion and external frame. In some examples, the internal strap is coupled to the display portion and/or the eternal frame via a pivot point such that when tension is applied to the internal strap the forehead interface portion may rotate about the pivot point to conform to the user's forehead.

In some examples, the forehead interface portion of the headset includes a deformable material. The deformable material may include padding or other material configured to conform to a forehead of the user when the headset is secured to the user. The forehead interface portion may also include backing coupled to and disposed against the deformable material. The backing may comprise a rigid or semi-rigid material that maintains a shape and/or position of the deformable material. The backing may include an aperture or hole therein. Furthermore, the backing may be coupled to the internal strap and/or the backing may comprise a portion of the internal strap.

In some examples, the headset may include a switch coupled to the backing such that at least a portion of the switch is insertable within the aperture in the backing. At least a portion of the switch may contact the deformable material when the switch is inserted within the hole in the backing. In some examples, when the headset is attached (or otherwise secured) to the user, the deformable material is deformed such that the deformable material pushes against the switch causing the switch to be positioned in a first position (e.g., an open position). For example, when the headset is secured to the head of the user, the forehead of the user exerts a force on the deformable material, thereby deforming the shape of the deformable material and causing the switch to be positioned in the first position. In some examples, at least a portion of the switch is disposed out of the hole in the backing when the switch is in the first position. The switch may be biased toward a second position (e.g., closed position), such that when the headset is removed from the user, the switch transitions to the second/closed position. However, in other examples, the configuration of the switch may be reversed such that the switch is biased toward the open position (when the headset is removed from the user), and the switch is pressed into the closed position when the headset is attached to the user.

In some examples, the switch includes a body that is insertable into the hole in the backing such that at least a portion of the body of the switch contacts the deformable material (or other portion of the internal strap) when the switch is in the second position (i.e., when the headset is not attached to a user or when the display structure is moved away from a face of the user). The switch further includes one or more spring members extending from a top portion of the body. The spring members exert a retaining force on the body of the switch, retaining the body within the hole and biasing the body toward the closed position of the switch, unless a force overcomes the retaining force of the spring members in order to push the body of the switch at least partially out of the hole.

Furthermore, in some examples, the switch includes an arm extending from a bottom portion of the body. The arm of the switch may include a first electrical contact that contacts a second electrical contact of the switch when the switch is in the second position (e.g., closed position), thereby completing a circuit of the switch. When the switch is in the second position (e.g., closed position, thereby completing the circuit), the switch may send a signal (e.g., voltage or current) to one or more processors of the headset 100, indicating that the switch is closed. The processor(s) may determine, based on the signal, that the switch is closed for a predetermined amount of time and may determine that the headset is unattached to the user. Alternatively, when the switch is in the first position (e.g., open position, thereby breaking the circuit), the switch does not send a signal (or sends a second, different signal) to the one or more processors of the headset 100. If the one or more processors do not receive a signal from the switch (or receives the second signal) for a predetermined amount of time, the processor(s) may determine that the switch is open, indicating that the headset is attached to the user. Alternatively, as mentioned above, the configuration of the switch may be reversed such that the switch is open when unattached from the user and closed when attached to the user.

In some examples, the internal strap may include and/or be coupled to a back portion of the headset. The back portion of the headset may also be coupled to the external frame. The back portion may include padding and is configured to conform to a back of the head of the user when the headset is secured to the user. In some examples, the internal strap is adjustable to alter a distance between the forehead interface portion and the back portion of the headset.

In some examples, the external frame may contain and/or include an audio component coupled thereto. The audio component may be located on the first side piece and/or the second side piece of the external frame. In some examples, the audio component may include one or more speakers configured to output audio data to the user. Additionally, and/or alternatively, the audio component may include one or more microphones configured to generate audio data.

These and other aspects are described further below with reference to the accompanying drawings.

FIG. 1 illustrates a perspective view of an example headset 100 having a user detection switch 102 (referred to herein as "the switch 102"). The headset 100 may include an electronic headset device configured to output media content to a user in an extended reality environment. The headset 100 may include an external frame 104. The external frame 104 of the headset 100 defines a general exterior shape of the headset 100. In some examples, the external frame 104 may include a semi-rigid material such as polycarbonate acrylonitrile butadiene styrene (PC/ABS) or other suitable material. Though the external frame 104 is adjustable, as described further herein, the external frame 104 is configured to maintain a rigid shape, allowing the headset 100 to be safely and comfortably secured to a head of a user.

In some examples, the external frame 104 includes a first side piece 106 and a second side piece 108 located on opposite sides of the headset. The first side piece 106 and the second side piece 108 are adjustable such that the first side piece 106 and the second side piece 108 extend or retract, thereby securing the headset 100 to a head of a user.

In some examples, the external frame 104 of the headset 100 is coupled to a display structure 110 that is configured to fit over at least a portion of a user's eyes. The display structure 110 may include one or more display devices via which media content, including image data, may be displayed or otherwise output to the user. The display devices may include display screens, projectors, lenses, heads-up displays, etc. and may be capable of providing an extended reality display. While the illustrates examples is a virtual reality headset in which the display devices completely obstruct the user's field of view, in other examples, the display devices may be at least partially transparent or translucent such that the user is able to see through the display devices and perceive the real world environment surrounding the user (i.e., the display devices do not occlude the user's field of view). The display structure 110 may include a content delivery system which may present media content. The content delivery system is a near eye display (NED) which may be worn on the face of the user such that visual content is presented to the user. Content presented to the user via the display devices includes, for example, one or more images, video, light, or a combination thereof.

In some examples, the headset 100 includes an internal strap 112. The internal strap 112 may be located inside the external frame 104 and coupled thereto. In some examples, the internal strap 112 may directly contact at least a portion of the head of the user when the headset 100 is attached to the user. The internal strap 112 may comprise an elastic material such as an elastic polymer. In some examples, the internal strap 112 includes a first end 114 and a second end 116. The headset 100 includes an adjustment mechanism 118 configured to engage with the first end 114 and the second end 116 of the internal strap 112. The adjustment mechanism 118 may include a rachet, wheel, gear, or other type of adjustment mechanism. In some examples, when the adjustment mechanism 118 is adjusted (e.g., rotated or otherwise adjusted) the first end 114 and the second end 116 of the internal strap 112 move relative to one another, thereby causing tension to be applied or released from the internal strap 112 when the internal strap 112 is contacting the head of the user.

In some examples, the internal strap 112 may include and/or be coupled to a forehead interface portion 120 of the headset 100. The forehead interface portion 120 of the headset 100 is located a front of the internal strap 112 and is configured to conform to a forehead of a user, when the headset 100 is secured to the user. In some examples, the forehead interface portion 120 is rotatably coupled to the external frame 104 and/or the display structure 110 via a pivot point 122. By applying tension to the internal strap, the forehead interface portion 120 rotates around the pivot point 122.

In some examples, the forehead interface portion 120 of the headset 100 includes a deformable material 124. The deformable material 124 may include padding, such as foam, or other material configured to conform to a forehead of the user when the headset is secured to the user. For example, the deformable material 124 comprises an arcuate sheet of foam material disposed within the internal strap 112 and is configured to conform to a forehead of the user when the device is worn by the user. The deformable material 124 may be substantially spherical in shape. In some examples, the deformable material 124 may have a contact area, configured to contact the user's forehead, that is larger than a surface area of a portion of the internal strap 112 to which the deformable material 124 is coupled so as to spread the force of the internal strap 112 over a larger surface area of the user's head.

The forehead interface portion 120 may also include backing 126 coupled to and/or disposed against the deformable material 124. The backing 126 may include a hole or aperture therein (illustrated in FIG. 2). The backing may comprise a semi-rigid material that maintains a shape and/or position of the deformable material 124. The backing 126 may be coupled to the internal strap 112 and/or the backing 126 may comprise a portion of the internal strap 112.

As mentioned previously, the headset 100 includes a switch 102 coupled to the internal strap 112 of the headset 100. In some examples, the switch 102 may include a limit switch. Additionally, and/or alternatively, the switch 102 may include a button switch, throw switch, slide switch, or any other suitable switch. In some examples, the switch 102 may be coupled to the forehead interface portion 120 of the internal strap 112. However, the switch 102 may be disposed in one or more alternate locations on the headset 100. For example, the switch 102 may be disposed on a back portion 128 of the headset 100, on a side piece (e.g., the first side piece 106 or the second side piece 108) of the external frame 104, or along the internal strap 112. In some examples, at least a portion of the switch 102 is insertable within the hole in the backing 126 (shown in FIG. 2). As such, at least a portion of the switch 102 contacts that deformable material 124 when the switch is coupled to the forehead interface portion 120 of the headset 100.

In some examples, when the headset 100 is attached, or otherwise secured, to the user, the deformable material 124 is deformed by a forehead of the user such that the deformable material 124 pushes against the switch 102 causing the switch to be positioned in a first position. When the switch 102 is in the first position, the switch 102 may be in an open position where electrical contacts of the switch 102 are separated from each other. In response to the switch 102 being positioned in the open position, the switch 102 may send a first signal (e.g., voltage or current) to one or more processors (illustrated in FIG. 5) of the headset 100, indicating that the switch 102 is open. Alternatively, the switch 102 may not send the first signal to the processor(s) and the processor(s) may determine that the switch 102 is open based on an absence of the first signal for a predetermined amount of time (e.g., a threshold amount of time). In some examples, at least a portion of the switch 102 is disposed out of the hole in the backing 126 when the switch 102 is in the first position. When the switch 102 is in the first position, one or more processors may cause the headset 100 to operate in a first state. When in the first state, the headset 100 may be powered on and/or output media content.

In some examples, the switch 102 may be biased toward a second position (e.g., closed position), such that when the headset 100 is removed from the user, the switch 102 transitions to the second/closed position. However, in other examples, the configuration of the switch 102 may be reversed such that the switch 102 is biased toward the open position (when the headset 100 is removed from the user), and the switch 102 is pressed into the closed position when the headset 100 is attached to the user. When the switch 102 is in the second position, the switch 102 may be in a closed position where electrical contacts of the switch 102 contact each other. In some examples, the switch 102 may send a second signal (e.g., voltage or current) (different than the first signal) to one or more processors of the headset 100, indicating that the switch 102 is closed. The processor(s) may determine, based on the second signal, that the switch is closed for a predetermined amount of time (e.g., a threshold amount of time) and may determine that the headset 100 is unattached to the user. Based at least in part on determining that the switch 102 is closed, the processor(s) may cause the headset 100 to operate in a second state. When in the second state, the headset 100 may be powered off, in a sleep mode, and/or refrain from outputting media content.

In some examples, the external frame 104 further contains and/or includes an audio component coupled thereto. The audio component may be disposed on the first side piece 106 and/or the second side piece 108 of the external frame. In some examples, the audio component 130 may include one or more speaker(s) configured to output audio data to the user. Additionally, and/or alternatively, the audio component may include one or more microphone(s) configured to generate audio data.

Figure 2:
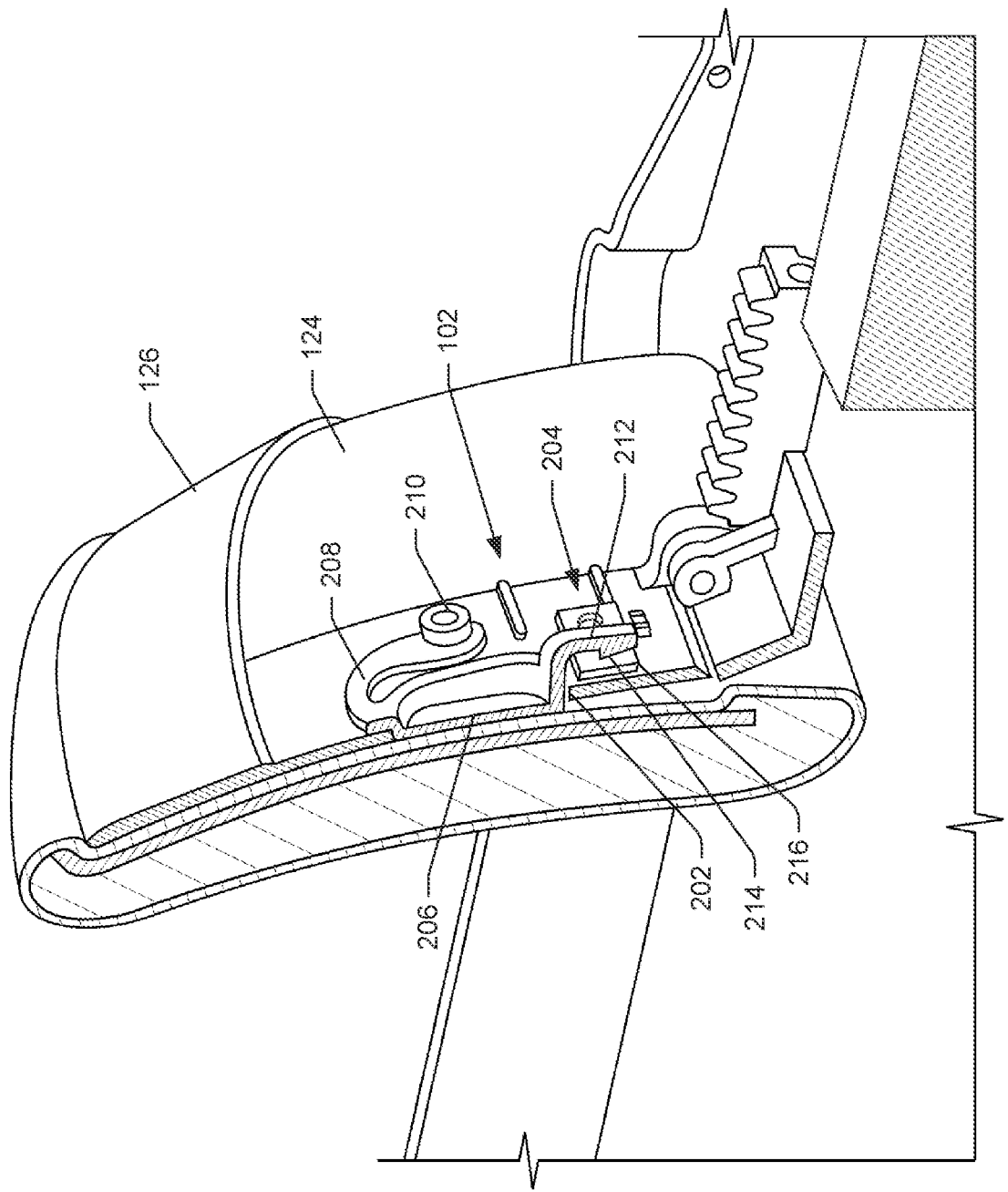
FIG. 2 illustrates a perspective cross-sectional view of the example headset device of FIG. 1 taken along line A-A in FIG. 1, in accordance with an example of the present disclosure.

FIG. 2 illustrates a perspective cross-sectional view of the headset 100 taken along line A-A in FIG. 1. As mentioned previously, the backing 126 may include a hole 202 therein. In some examples, at least a portion of the switch 102 may be disposed within the hole 202 when the switch 102 is in a second position 204 (e.g., a closed position). For example, the switch 102 includes a body 206 that is at least partially insertable into the hole 202 in the backing 126 such that at least a portion of the body 206 of the switch 102 contacts the deformable material 124 when the switch 102 is in the second position 204 (i.e., when the headset 100 is not attached to a user or when the display structure 110 is moved away from a face of the user).

In some examples, the switch 102 further includes one or more spring members 208 extending from a top portion of the body 206. The spring members 208 exert a retaining force on the body 206 of the switch 102, thereby retaining the body 206 within the hole 202, unless a force is exerted on the body 206 that overcomes the retaining force of the spring members 208 in order to push the body 206 of the switch at least partially out of the hole 202. In some examples, the spring members 208 may be coupled to the backing 126 of the forehead interface portion 120 via one or more fasteners 210.

In some examples, the switch 102 includes an arm 212 extending from a bottom portion of the body 206. The arm 212 of the switch 102 may include a first electrical contact 214 that contacts a second electrical contact 216 of the switch 102 when the switch 102 is positioned in the second position 204 (e.g., closed position), thereby completing a circuit of the switch 102. When the switch 102 is in the second position 204, the switch 102 may send a signal to the one or more processors of the headset 100, indicating that the switch 102 is closed.

Figure 3:
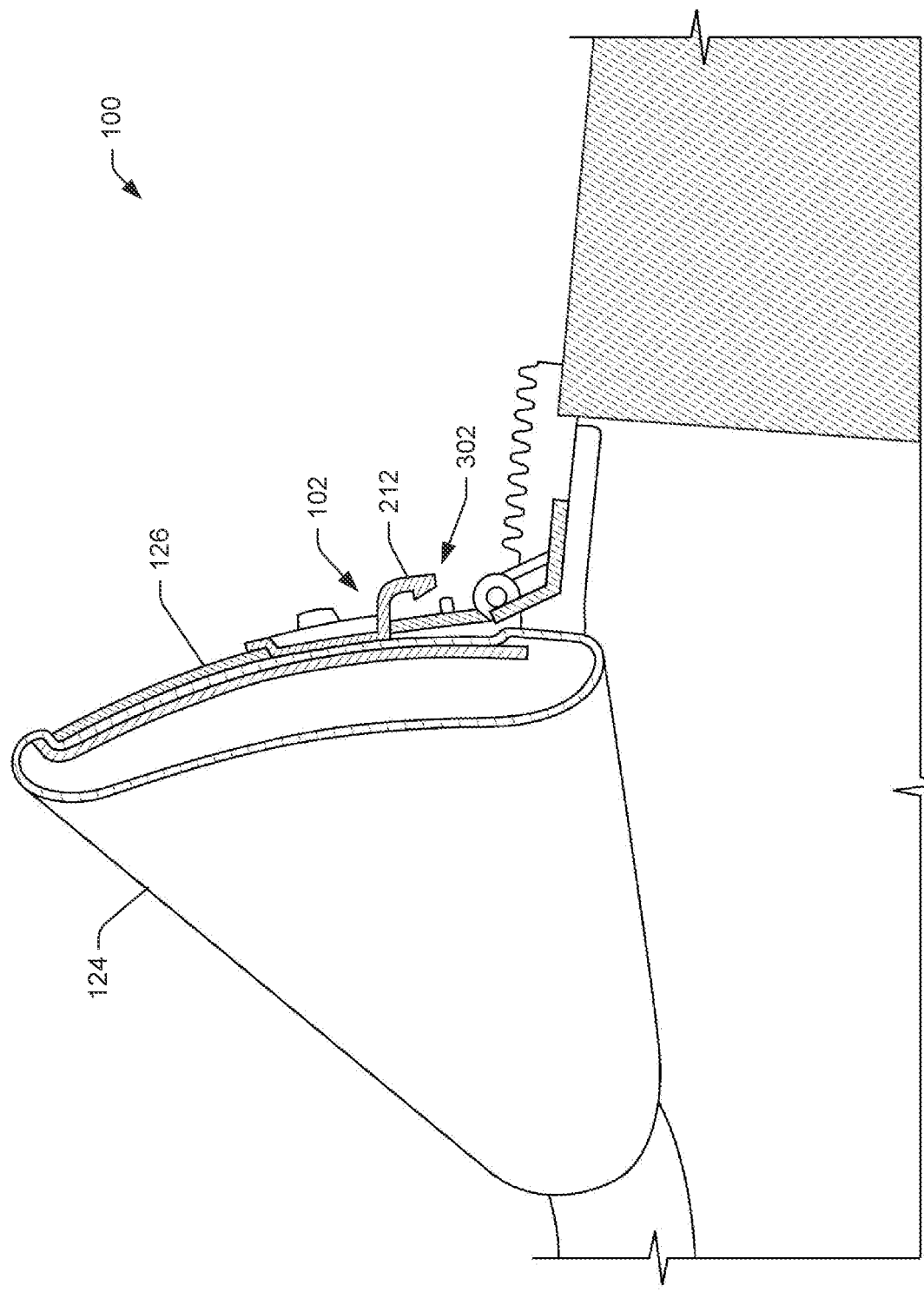
FIG. 3 illustrates a cross-sectional view of the example headset device of FIG. 1 taken along line A-A in FIG. 1, showing the user detection switch in a first position, in accordance with an example of the present disclosure.

FIG. 3 illustrates a cross-sectional view of the headset 100 taken along line A-A in FIG. 1. FIG. 3 illustrates the switch 102 in the first position 302 (e.g., open position). When the switch 102 is positioned in the first position 302, the switch 102 is open, thereby breaking the circuit, and the switch 102 does not send a signal to the processor(s) of the headset 100. Additionally, and/or alternatively, the switch 102 may be configured to send a first signal to the processor(s), indicating the switch 102 is in the first position. In some examples, if the processor(s) do not receive a signal from the switch 102 for a predetermined amount of time (or if the processor(s) receive the first signal), the processor(s) may determine that the switch 102 is in the first position (e.g., the open position). The processor(s) may further determine that the switch 102 has been in the first position for a predetermined (or threshold) amount of time and may determine that the headset 100 is attached to the user.

Figure 4:
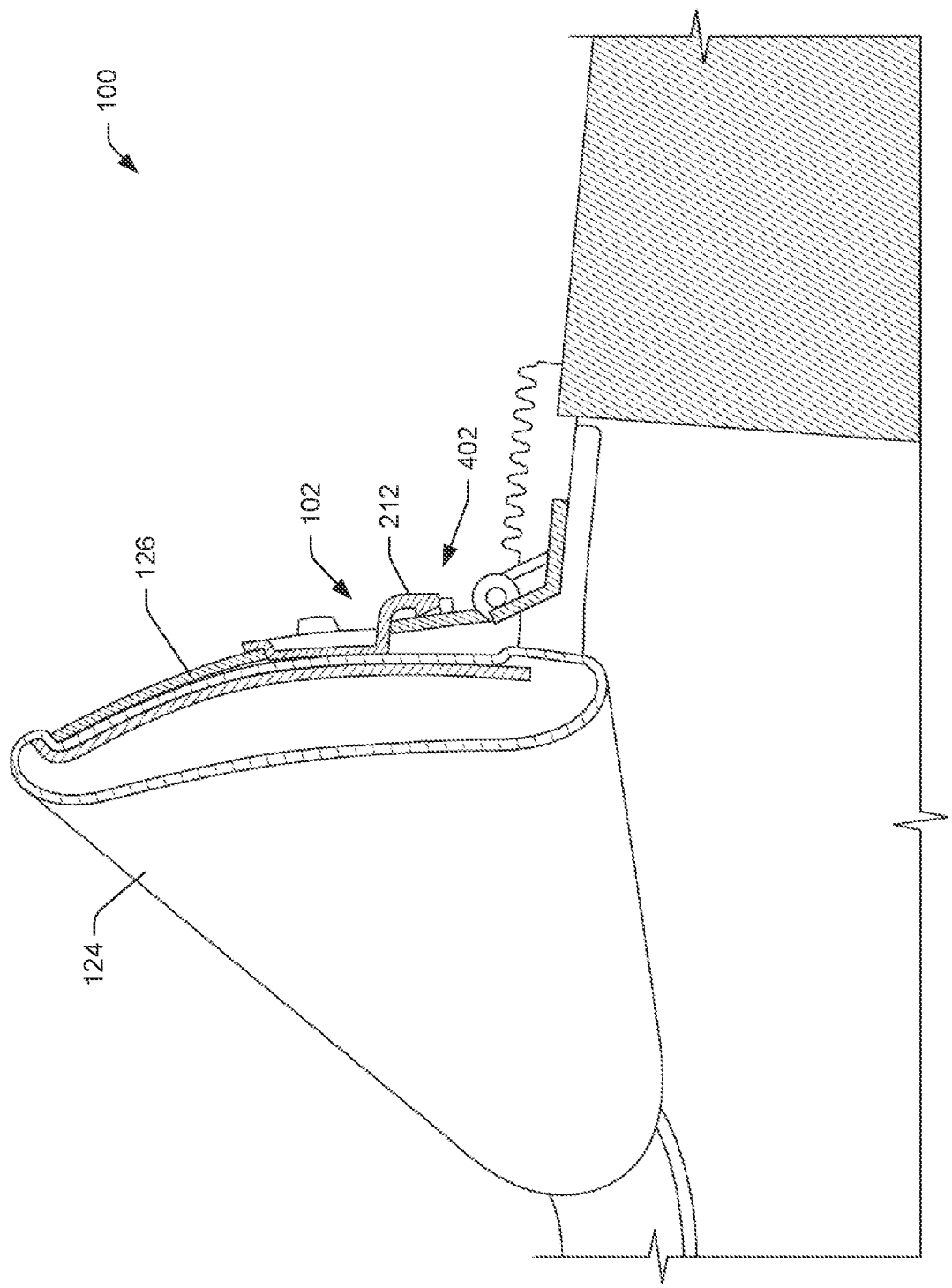
FIG. 4 illustrates a cross-sectional view of the example headset device of FIG. 1 taken along line A-A in FIG. 1, showing the user detection switch in a second position, in accordance with an example of the present disclosure.

FIG. 4 illustrates a cross-sectional view of the headset 100 taken along line A-A in FIG. 1. FIG. 4 illustrates the switch 102 in the second position 402 (e.g., closed position). When the switch 102 is positioned in the second position 402, the switch is closed, thereby completing the circuit, and the switch 102 sends a signal to the processor(s) of the headset 100. In some examples, if the processor(s) receive the signal from the switch 102, the processor(s) may determine that the switch 102 is in the second position 402 (e.g., the closed position). The processor(s) may further determine that the switch 102 has been in the second position 402 for a predetermined amount of time (e.g., threshold amount of time) based at least in part on the signal and may determine that the headset 100 is removed from the user.

Figure 5:
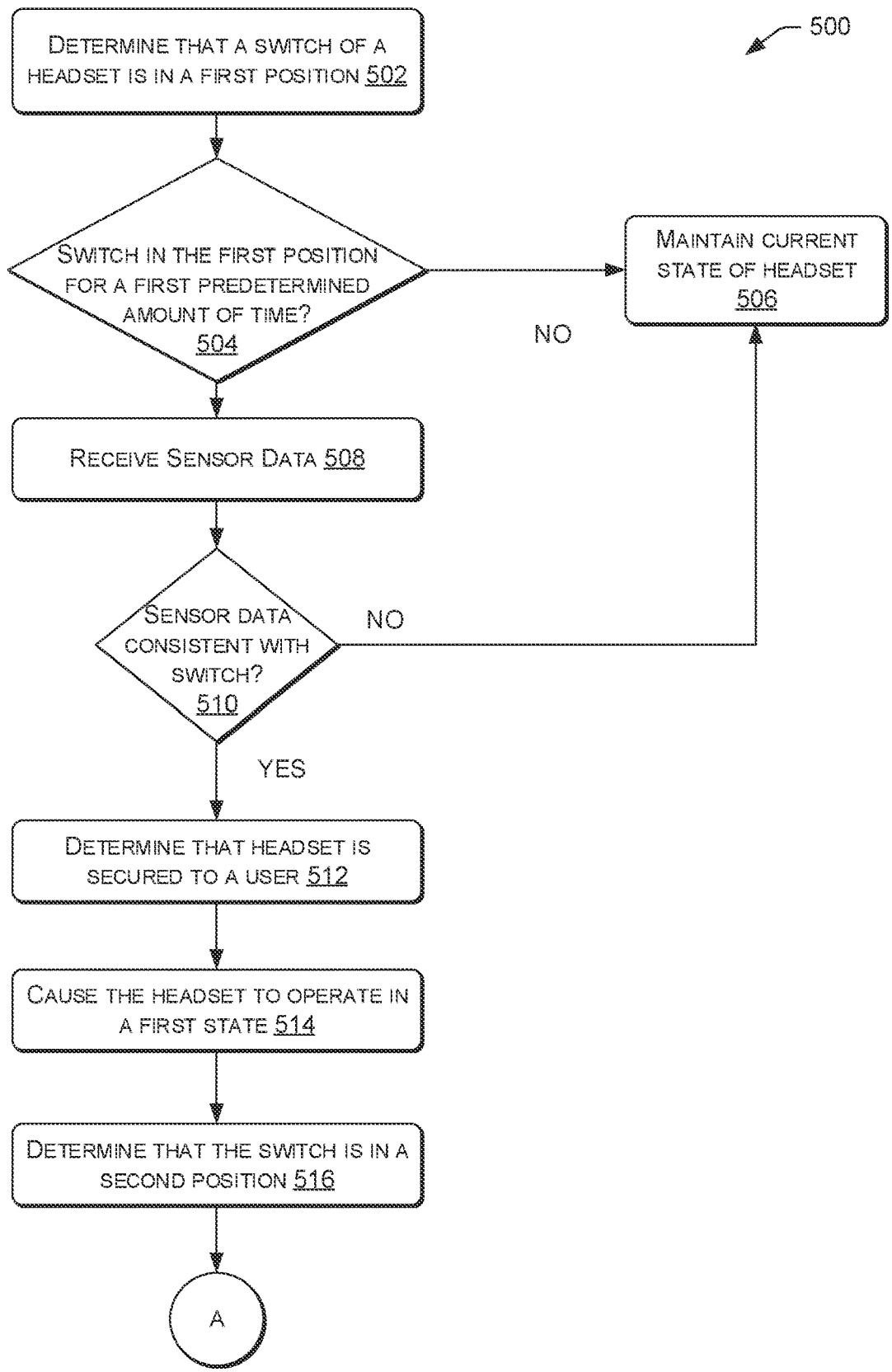
FIG. 5 illustrates a flowchart of an example process for determining user presence associated with a headset device, in accordance with an example of the present disclosure.

FIG. 5 is a flowchart of an example process 500 for determining user presence associated with the headset 100. The process 500 may be performed by components of a system, discussed above with respect to FIGS. 1-4 and further illustrated in FIG. 6. The process 500 may be performed at least in part by one or more processors of the headset 100. Furthermore, the process 500 may include different and/or additional steps, or perform the steps in a different order than described herein.

At 502, the process 500 includes determining that a switch of a headset is in a first position. In some examples, the first position of the switch may correspond with an open state of the switch. As such, one or more processors may receive a signal indicating that the switch moved from a second position to the first position, thereby indicating that the switch was opened. Additionally, and/or alternatively, the one or more processors may determine that signal was not received from the switch and may, therefore, determine that the switch is in the first position. In some examples, and as described previously, the switch may be positioned in the first position when the headset is secured to a user.

At 504, the process 500 includes determining whether the switch is in the first position for a first predetermined amount of time. In some examples, the first predetermined amount of time is a first threshold amount of time. Furthermore, in some examples, the one or more processors may determine an amount of time that the switch has been in the first position and compare the amount of time with the predetermined amount of time. The first predetermined amount of time may include between approximately 10 milliseconds and approximately 10 seconds, between approximately 500 milliseconds and approximately 5 second, or between approximately 1 second and approximately 3 seconds. While various ranges are given by way of example, the first predetermined amount of time may be configured to be any amount or range of time.

If, at 504, the one or more processors determine that the switch has been in the first position for an amount of time that is less than the predetermined amount of time, the one or more processors may maintain a current state of the headset, at 506. For example, if the headset is not outputting content, at 504, and the one or more processors determine that the switch has not been in the first position for the predetermined amount of time, the one or more processors may refrain from outputting content or prevent content from being output on the headset. Furthermore, if the headset is in a standby state (or sleep mode) at 504, the one or more processors may maintain the standby state (or sleep mode) at 506. When in a powered off or standby state, at least some of the sensor(s) can still detect change in state and can be used to power the device on. As such, the process 500 described herein may prevent the headset from outputting content when the headset is not secured to the user, thereby preserving battery life of the headset and/or preventing a user from missing various portions of media content that may otherwise play while the headset is not secured to the user.

If, however, at 504, the one or more processors determine that the switch has been in the first position for an amount of time that is equal to or greater than the predetermined amount of time, the one or more processors may optionally receive additional sensor data from one or more sensors, at 508. For example, the one or more processors may receive sensor data from one or more of the IR sensor(s), camera(s), inertial measurement unit(s), microphone(s), capacitance sensor(s), or other sensor(s). In some examples, the one or more processors may use the sensor data to validate data received from the switch indicating a position of the switch. That is to say, while the one or more processors may determine that the headset is secured to the user based on the position of the switch, the one or more processors may confirm or correct such a determination based on sensor data generated by and received from sensor(s) of the headset. Additionally, and/or alternatively, the one or more processors may determine that the headset is secured to the user based on the sensor data and may confirm or correct such a determination based on a position of the switch. When additional sensor data is received at 508, the one or more processors may weight the data (e.g., data indicating a position of the switch) received from the switch differently than the sensor data received from the sensor(s) to determine if the device is secured to the user. For example, data received from the switch may be weighted more heavily than the data received from the sensor(s). Alternatively, the one or more processors may weight the sensor data more heavily than the data received from the switch. In some examples, if the switch has remained in the same position for extended periods of time (e.g., if the switch is stuck), then the data received from the switch may be downweighted or discounted.

At 510, the process 500 includes determining whether the sensor data is consistent with the switch. For example, if the one or more processors determine, at 502, that the switch is in the first position, indicating that the headset is secured to the user, the one or more processors may determine whether the sensor data received from the sensor(s) is consistent with the switch.

If, at 510, the one or more processors determine that the sensor data is inconsistent with the switch, the one or more processors may maintain a current state of the headset, at 506. However, if the one or more processors determine that the sensor data is consistent with the switch, the one or more processors may determine that the headset is secured to the user, at 512.

At 514, the process 500 includes causing the headset to operate in a first state. In some examples, the first state may include a device state where the headset is powered on and/or the headset is outputting media content. For example, when operating in the first state, the headset may output audio, image, or other media content via various components of the headset.

At 516, the process 500 includes determining that the switch is in a second position. In some examples, the second position may correspond with a closed state of the switch. For example, when the switch is in the second position, a first electrical contact of the switch contacts a second electrical contact of the switch. As such, one or more processors may receive a signal indicating that the switch is in the second position. In some examples, and as described previously, the switch may be positioned in the second position when the headset is removed to the user.

Figure 6:
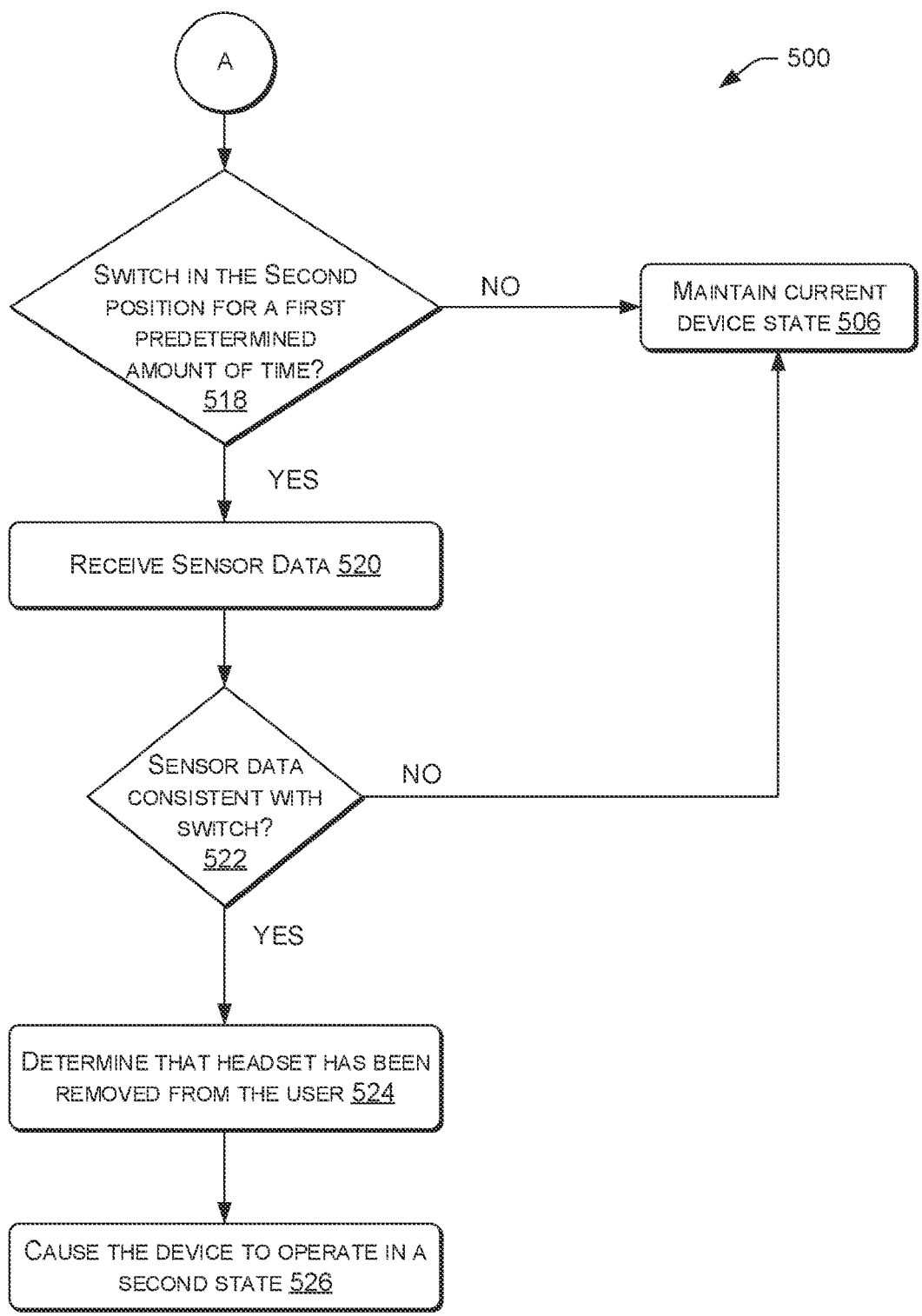
FIG. 6 illustrates a continuation of the flowchart shown in FIG. 4 associated with the example process for determining user presence associated with a headset device, in accordance with an example of the present disclosure.

The flow diagram in FIG. 6 continues the illustration of the process 500. At 518, the process 500 400 further includes determining whether the switch is in the second position for a second predetermined amount of time. In some examples, the second predetermined amount of time includes a second threshold amount of time. The second predetermined amount of time may include between approximately 10 milliseconds and approximately 10 seconds, between approximately 500 milliseconds and approximately 5 second, or between approximately 1 second and approximately 3 seconds. While various ranges are given by way of example, the second predetermined amount of time may be configured to be any amount or range of time.

If, at 518, the one or more processors determine that the switch has been in the second position for an amount of time that is less than the predetermined amount of time, the one or more processors may maintain a current state of the headset, at 504. For example, if the headset is outputting content and the one or more processors determine that the switch has not been in the second position for the predetermined amount of time, the one or more processors may cause the headset to continue outputting content on the headset. As such, the process 500 may prevent the headset from causing inadvertent or unwanted stoppages related to output of media content. For example, a user may briefly adjust the headset while keeping the headset secured to their head. In such an example, a user may grow frustrated if the headset pauses output of the media content, places the headset in a sleep state, or powers off the headset when the user merely adjusts a position of the headset on the head and/or face of the user. As such, the process 500 described herein, may prevent user frustration and an improved experience.

If, however, at 518, the one or more processors determine that the switch has been in the second position for an amount of time that is equal to or greater than the second predetermined amount of time, the one or more processors may optionally receive sensor data from the sensor(s), at 520. Similar to steps 508 and 510, the sensor data received at 520 may be used to validate the indication that the switch has been in the second position for an amount of time that is equal to or greater than the second predetermined amount of time. Additionally, and/or alternatively, the one or more processors may use the sensor data to determine that the device has been removed from a user and confirm the sensor data with the position of the switch. When additional sensor data is available, the data received from the switch and the sensor data may be weighted differently. For example, data received from the switch may be weighted more heavily than the data received from the sensor(s). Alternatively, the sensor data received from the sensor(s) may be weighted more heavily than the data received from the switch. However, if the switch has remained in the same position for extended periods of time (e.g., if the switch is stuck), then the data received from the switch may be downweighted or discounted.

At 522, the process 500 includes determining whether the sensor data is consistent with the switch. For example, if the one or more processors determine, at 516, that the switch is in the second position, indicating that the headset is removed from the user, the one or more processors may determine whether the sensor data received from the sensor(s) is consistent with the switch.

If, at 522, the one or more processors determine that the sensor data is inconsistent with the switch, the one or more processors may maintain a current state of the headset, at 506. However, if the one or more processors determine that the sensor data is consistent with the switch, the one or more processors may determine that the headset is removed from the user, at 524.

At 526, the process 500 includes causing the device to operate in a second state. In some examples, the second state is different than the first state and may include a device state where the headset is powered off, in a sleep state, pauses and/or stops media content output, etc. For example, when operating in the second state, the headset may cease and/or prevent output of audio, image, or other media content via components of the headset.

Figure 7:
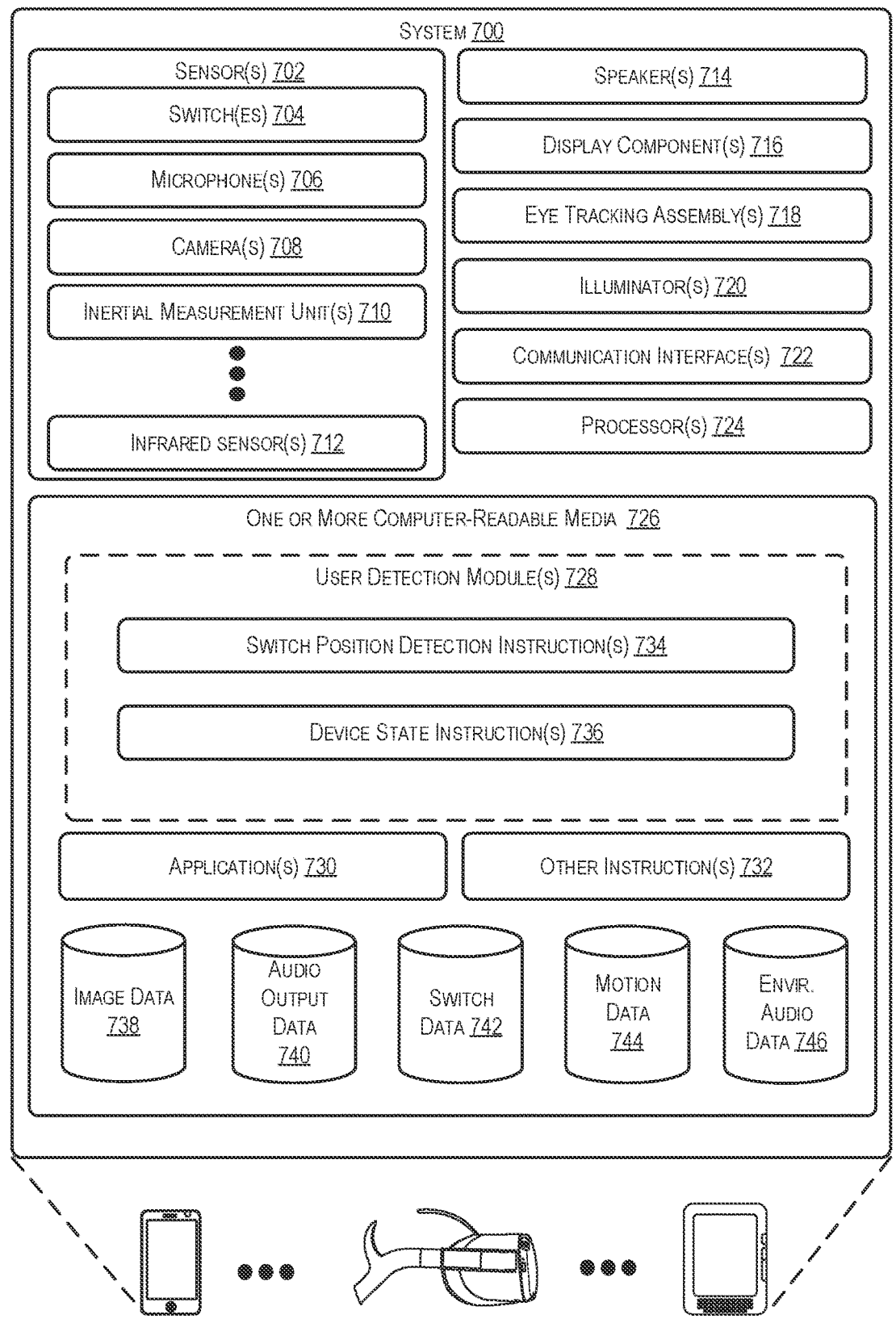
FIG. 7 illustrates an example system for determining user presence associated with a headset device, in accordance with an example of the present disclosure.

FIG. 7 is an example system 700700 for determining user presence associated with a headset. In some examples, components of the system 700700 shown in FIG. 7 may be configured and/or stored locally at the headset. Additionally, and/or alternatively, one or more components of the system 700700 may be stored remote from the headset and the headset may be communicatively connected to the remote components of the system.

As discussed above the system 700 may be configured to provide or a immerse a user in a virtual reality, mixed reality, augmented reality, extended reality scene using a headset device. For example, the headset may correspond to a head mounted display, NED, or other headset for providing media content to the user. While the system 700, described herein, is discussed with respect to a headset system (like the headset 100 shown and described in FIGS. 1-4), it should be understood that in other examples, the system 700 may comprise other display systems, such as monitors, tablets, notebooks, smartphones, and the like.

In some examples, the system 700 includes one or more sensors 702. The sensor(s) 702 may be disposed on and/or within the headset in various locations. In some examples, the system 700 may use data generated by one or more of the sensor(s) to determine presence of a user.

The sensor(s) 702 may include one or more switches 704. The switch(s) 704 may be substantially similar to and/or the same as switch 102 shown and described with respect to FIGS. 1-4. As such, the switch(s) 704 may be configured to measure deformation of one or more portions of the headset when the headset is secured to a user by mechanical movement of the switch due to the deformation. In some examples, the system 700 may determine presence of a user based on indications received from the switch(s) 704. Furthermore, the system 700 may determine the presence of a user based on indications from the switch(s) 704 and based on data generated by and received from one or more other sensor(s). However, in some examples, the system 700 may prioritize an indication received from the switch(s) 704 to determine the presence of the user.

In some examples, the sensor(s) 702 further include one or more microphones 706, one or more cameras 708, one or more inertial sensors (e.g., inertial measurement units (IMU), accelerometers, etc.) 710, one or more infrared (IR) sensors 712, and/or any other type of sensor. While the microphone(s) 706 may perform additional functions, with respect to user detection, the microphone(s) may generate audio data that the system 700 uses to determine that a user has picked up the headset, has attached the headset to their person, has removed the headset, or other determinations. In some examples, the system 700 may analyze the audio data along with indication (such as signals or absence of signals) received from the switch(s) 704 to determine presence of a user.

Furthermore, the camera(s) 708 that are configured to generate image data. In some examples, at least one camera of the camera(s) 708 is positioned such that a field of view of the camera is directed towards the user when the headset is worn by the user. As such, the camera 608 may generate image data that the system 700 analyzes to determine whether the headset is attached to the user.

Likewise, the inertial sensor(s) 710 may generate data related to acceleration, rotation, or other movement of the headset. While the inertial sensor(s) 710 may perform additional functions, with respect to user detection, the inertial sensor(s) 710 may generate data that the system 700 uses to determine user presence. In some examples, the system 700 may analyze the data received from the inertial sensor(s) 710 along with indications received from the switch(s) 704 to determine presence of a user.

Furthermore, the IR sensor(s) 712 may generate and detect IR radiation to determine presence of a user and/or other objects. In some examples, the IR sensor(s) 712 include active IR sensor(s) that emit and detect IR radiation. In some example, the IR sensor(s) 712 may send an indication to the system 700 when an object or user is proximate the IR sensor(s) 712. The system 700 may use such an indication, in conjunction with the indications received from the switch(s) 704, to determine presence of a user.

In some examples, the system 700 further includes one or more speakers 714. The speaker(s) 714 may cause sound associated with the content to being delivered to the user to be output via one or more audio components coupled to the headset. As discussed above, the system 700 may also include a headset having a display structure or other display system. In some examples, the headset of the system 700 may comprise one or more display components 716 to present media content to the user. The system 700 may further include one or more eye-tracking assemblies 718 and one or more illuminators 720 for generating gaze data associated with the user. For example, the eye-tracking assembly(s) 718 may comprise one or more camera(s), IR devices, depth camera assemblies, and the like to capture image data associated with eyes of the user. The illuminator(s) 720 may include one or more infrared illuminators that may produce structured light (e.g., dot patter, bars, etc.) in infrared, infrared flash for time-of-flight, and so forth, such that the eye-tracking assembly(s) 718 may then determine gaze data associated with the eyes of the user based on, for instance, infrared reflections between the cornea and pupils.

The system 700 may also include one or more communication interfaces 722 configured to facilitate communication between one or more networks, one or more cloud-based systems, and/or one or more physical objects, such as a hand-held controller. The communication interface(s) 722 may also facilitate communication between one or more wireless access points, a master device, and/or one or more other computing devices as part of an ad-hoc or home network system. The communication interface(s) 722 may support both wired and wireless connection to various networks, such as cellular networks, WiFi networks, short-range or near-field networks (e.g., Bluetooth®), infrared signals, local area networks, wide area networks, the Internet, and so forth.

The system 700 may also include one or more processors 724, such as at least one or more access components, control logic circuits, central processing units, or processors, as well as one or more computer-readable media 726 to perform the function associated with the extended environment. Additionally, each of the processor(s) 724 may itself comprise one or more processors or processing cores.

Depending on the configuration, the computer-readable media 726 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor(s) 724.

Several modules such as instructions, data stores, and so forth may be stored within the computer-readable media 726 and configured to execute on the processor(s) 724. For example, as illustrated, the computer-readable media 726 may store a user detection module 728, various application 730, as well as other instructions 732, such as an operating system. In some examples, the user detection module 728 may include switch position detection instructions 734, device state instructions 736, and the like. The computer-readable media 726 may also store data usable by the various applications 730 and instructions 734, 736, and 732. The stored data may include image data 738, audio output data 740, switch data 742, motion data 744, environmental audio data 746, and the like.

The switch position detection instructions 734 may be configured to receive the switch data 742 associated with a position of the switch of the headset. The switch position detection instructions 734 may also receive image data 738 representative of a field of view of one or more camera(s) within the headset that may face a user when the headset is secured to the user. The switch position detection instructions 734 may also receive motion data 744 representative of motion of the headset. Furthermore, the switch position detection instructions 734 may receive environmental audio data 746 representative of noise in the environment surrounding the headset. The switch position detection instructions 734 may implement the above described data to determine a position of the switch, which is indicative of whether the headset is secured to a user. As such, the system 700 may determine presence of a user based on the position of the switch and/or based on additional data generated by the system 700.

The device state instructions 736 may cause the headset to operate in one or more states based on determining whether the headset is secured to the user. For example, the device state instructions 736 may cause the device to operate in a first state based on determining that the headset is secured to the user. The first state may include, in some examples, a state where the headset is powered on, is outputting content, etc. The device state instructions 736 may also cause the device to operate in a second state based on determining that the headset is removed from the user. The second state may include, in some examples, a state where the headset is powered off, is in a sleep state, pauses and/or stops media content output, etc.

The foregoing description has been presented for illustration; it is not intended to be exhaustive or to limit the scope of the disclosure to the precise forms disclosed. Persons skilled in the relevant art can appreciate that many modifications and variations are possible considering the above disclosure.

Some portions of this description describe the examples in terms of algorithms and symbolic representations of operations on information. These algorithmic descriptions and representations may be used by those skilled in the data processing arts to convey the substance of their work effectively to others skilled in the art. These operations, while described functionally, computationally, or logically, are understood to be implemented by computer programs or equivalent electrical circuits, microcode, or the like. The described operations and their associated components may be embodied in software, firmware, hardware, or any combinations thereof.

Any of the steps, operations, or processes described herein may be performed or implemented with one or more hardware or software modules, alone or in combination with other devices. In examples, a software module is implemented with a computer program product comprising a computer-readable medium containing computer program code, which can be executed by a computer processor for performing any or all the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A device comprising:
   a display;
   an internal strap coupled to the display, the internal strap being adjustable to secure the device to a user;
   a deformable material coupled to a portion of the internal strap and configured to contact the user when the device is secured to the user;
   a backing layer disposed against the deformable material, the backing layer including an aperture therein; and
   a switch coupled to the backing layer and configured such that at least a portion of the switch is insertable in the aperture of the backing layer, wherein the deformable material is configured to deform when the device is secured to the user, thereby causing the switch to be positioned in a first position when the device is secured to the user and a second position when the device is removed from the user.

2. The device of claim 1, further comprising:
   one or more processors communicatively coupled to the switch; and
   memory communicatively coupled to the one or more processors and storing instructions that, when executed by the one or more processors, configure the device to perform operations comprising:
      determining that the device is secured to the user based at least in part on determining that the switch is in the first position;
      causing the device to operate in a first state based at least in part on determining that the device is secured to the user, wherein the device outputs content via the display in the first state.

3. The device of claim 2, wherein the operations further comprise:
   receiving a signal from the switch;
   determining that the switch is in the second position based at least in part on the signal; and
   determining that the device is removed from the user based at least in part on the determining that the switch is in the second position.

4. The device of claim 2, the operations further comprising:
   receiving a signal from the switch;
   determining that the switch is in the second position based at least in part on the signal;
   determining that the switch has been in the second position for a predetermined amount of time; and
   causing the device to operate in a second state based at least in part on determining that the switch has been in the second position for the predetermined amount of time, wherein the device refrains from outputting content via the display in the second state.

5. The device of claim 1, wherein the deformable material is configured to contact a forehead of the user when the device is secured to the user and the deformable material is configured to deform in response to contact with the forehead of the user, thereby causing the switch to be positioned in the first position.

6. The device of claim 1, wherein the backing layer is coupled to the display via a pivot point.

7. The device of claim 1, wherein the switch includes:
   a body configured to be at least partially inserted in the aperture in the backing layer such that the body contacts the deformable material;
   an arm extending from a bottom portion of the body, the arm including a first electrical contact that contacts a second electrical contact of the switch when the switch is in a second position;
   one or more spring members extending from a top portion of the body and coupled to the backing layer, the one or more spring members configured to bias the arm of the switch toward the second position.

8. The device of claim 1, wherein the device comprises a head-mounted device and the display comprises an extended reality display.

9. The device of claim 1, wherein the deformable material comprises an arcuate sheet of foam material disposed within the internal strap and is configured to conform to a forehead of the user when the device is worn by the user.

10. A headset comprising:
    a display;
    an internal strap coupled to the display, the internal strap being adjustable to conform to a head of a user to secure the headset to the user;
    a backing layer, the backing layer including an aperture therein;
    a switch coupled to the backing layer and configured such that the at least a portion of the switch is insertable in the aperture of the backing layer, wherein the switch is configured to deform when a device is secured to the user, thereby causing the switch to be positioned in a first position when the device is secured to the user and a second position when the device is removed from the user.

11. The headset of claim 10, further comprising:
    a deformable material coupled to a portion of the internal strap and configured to contact the user when the headset is secured to the user; and
    the backing layer disposed against the deformable material.

12. The headset of claim 11, wherein the deformable material is configured to contact a forehead of the user when the headset is secured to the user and the deformable material is configured to deform in response to contact with the forehead of the user, thereby positioning the switch in the first position.

13. The headset of claim 10, wherein the switch includes:
a body configured to at least partially contact the internal strap of the headset when the switch is in the second position, wherein the switch is closed in the second position;
an arm extending from a bottom portion of the body, the arm including a first electrical contact that contacts a second electrical contact of the switch when the switch is in the second position; and
one or more spring members extending from a top portion of the body and coupled to at least a portion of the internal strap, the one or more spring members configured to bias the arm of the switch in the second position.

14. The headset of claim 10, wherein the display is configured to output image data when the switch is in the first position and the display is configured to cease output or prevent output of the image data when the switch is in the second position.

15. The headset of claim 10, wherein the internal strap includes:
a forehead interface portion configured to conform to a forehead of the user when the headset is secured to the user; and
a back portion configured to conform to a back of a head of the user when the headset is secured to the user, wherein the internal strap is adjustable to alter a distance between the forehead interface portion and the back portion.

16. A method comprising:
receiving, from one or more sensors, sensor data;
determining, via one or more processors of a device, that a switch is in a first position;
determining whether the sensor data is consistent with the determination that the switch is in the first position;
determining, via the one or more processors, that the switch is in a first position for a first predetermined amount of time;
determining, via the one or more processors, that the device is secured to a user based at least in part on the switch being in the first position for at least the first predetermined amount of time and the sensor data being consistent with the determination that the switch is in the first position; and
causing, via the one or more processors, the device to operate in a first state based at least in part on determining that the device is secured to the user.

17. The method of claim 16, wherein determining that the switch is in the first position includes receiving a signal from the switch indicating that the switch is closed.

18. The method of claim 16, further comprising:
determining, via the one or more processors, that the switch is in a second position;
determining, via the one or more processors, that the switch is in the second position for a second predetermined amount of time;
determining, via the one or more processors, that the device has been removed from the user based at least in part on determining that the switch is in the second position for the second predetermined amount of time; and
causing, via the one or more processors, the device to operate in a second state based at least in part on determining that the device has been removed from the user, wherein the device refrains from outputting content in the second state.

19. The method of claim 16, further comprising receiving, via the one or more processors, first data generated by one or more cameras or second data generated by one or more inertial sensors, wherein determining that the device is secured to the user is further based at least in part on the first data or the second data.

* * * * *